(12) United States Patent
Wass et al.

(10) Patent No.: US 12,062,804 B2
(45) Date of Patent: Aug. 13, 2024

(54) IMPACT PROTECTION PLATE

(71) Applicant: Stark Future, S.L., Sitges (ES)

(72) Inventors: Anton Wass, Sitges (ES); Paul Soucy, Sitges (ES)

(73) Assignee: Stark Future, S.L., Sitges (ES)

( * ) Notice: Subject to any disclaimer, the term of this patent is extended or adjusted under 35 U.S.C. 154(b) by 0 days.

(21) Appl. No.: 17/897,514

(22) Filed: Aug. 29, 2022

(65) Prior Publication Data

US 2023/0088716 A1    Mar. 23, 2023

(51) Int. Cl.
*B60R 19/44* (2006.01)
*B62J 23/00* (2006.01)
*H01M 50/242* (2021.01)
*H01M 50/249* (2021.01)
*H01M 50/262* (2021.01)

(52) U.S. Cl.
CPC ............ *H01M 50/242* (2021.01); *B62J 23/00* (2013.01); *H01M 50/249* (2021.01); *H01M 50/262* (2021.01); *B60R 19/44* (2013.01); *H01M 2220/20* (2013.01)

(58) Field of Classification Search
None
See application file for complete search history.

(56) References Cited

U.S. PATENT DOCUMENTS 4,616,866 A * 10/1986 Loren .................... B60R 19/22
293/120

* cited by examiner

*Primary Examiner* — Alexander S Thomas
(74) *Attorney, Agent, or Firm* — MaxGoLaw PLLC

(57) ABSTRACT

Impact protection plate that, applicable to motorcycles, bicycles and similar vehicles as protection means against impacts that can occur and affect the block (4) of the battery or the motor of the vehicle that includes: a protection external body (2) at least partly rigid directly joined to the block (4) of the battery or motor, and an internal core (1) of resilient material and absorbing impacts, intercalated between the lower base of the block (4) of the battery or motor to be protected and the external body (2) so that, in case of impact on the external body (2), a displacement of the rigid part of the body (2) towards the block (4) of the battery or motor and compressing the internal core (1) and capable to allow, when the impact ceases, that the external body (2) returns to its initial position ceasing to compress the internal core (1).

6 Claims, 4 Drawing Sheets

IMPACT PROTECTION PLATE

OBJECT OF THE INVENTION

The invention, as stated in the title of this specification, refers to an impact protection plate contributing, to the function to which it is designed, with advantages and characteristics that are disclosed in detail thereafter that means an improvement of the current state-of-the-art.

The object of this invention falls on an impact protection plate, applicable to motorcycles, bicycles and similar vehicles as impact protection means of the battery or the motor of the said vehicle which, formed as a sliding plate is essentially distinguished in that it includes an internal core of impact absorbing material and an external body with floating capacity, so that the said core "fills" the volume between the floating sliding plate and the internal components to convert the dynamic energy of the eventual impacts into kinetic energy and release it in heat through the foam, avoiding that the impact forces reach the said internal components or the driver of the vehicle.

FIELD OF APPLICATION OF THE INVENTION

The field of application of this invention is within the sector of the industry engaged in manufacturing accessories for motorcycles, bicycles and similar vehicles, in particular focusing in the field of the impact protection systems.

BACKGROUND OF THE INVENTION

Currently, to protect from impacts the motor or the battery of the vehicles, such as the motorcycles or bicycles, for example those of trial that receive a great number of impacts, they usually have a metal frame lining the lower part of the said elements. However, as it is a rigid element, in addition to be heavy, it does not result suitable because the impacts are absorbed and transferred to the motor or battery as well as to the driver of the vehicle.

In addition, in the case of motorcycles for trial, a high-density foam is also used that is fixed on an aluminum sliding plate to avoid the deformation when contacting with the motor. However, this solution does not either avoid the transmission of the energy that the impacts generate to the motor nor to the driver.

The objective of this invention is to provide an improved solution to the said problems by means of developing a protection that actually allows to absorb the energy provoked by the impacts and dissipate it instead of transferring it to the motor or battery or to the driver of the vehicle.

On the other hand, and as reference to the current state-of-the-art, at least the applicant is not aware of the existence of any other impact protection plate nor any other invention having a similar application, presenting technical and structural characteristics same or similar to those of the plate herein claimed.

EXPLANATION OF THE INVENTION

The impact protection plate that the invention proposes is configured as the suitable solution to the above-mentioned objective, the characterizing details making them possible and that distinguish it conveniently appearing in the final claims attached to this description.

Concretely, what the invention proposes, as it was said before, is a protection plate applicable to motorcycles, bicycles and similar vehicles as protection means against the impacts that can be produced and affect the battery or the motor of the said vehicle, which comprises:

a protection external body at least partly rigid directly joined to the block of the battery or motor, and an internal core of resilient material and absorbing impacts, such as the foam, intercalated between the lower base of the block of the battery or motor to be protected and the external body so that, in case of impact, the said core, that "fills" the volume between the external body and the block of the internal components to be protected, either the motor or the battery of the vehicle and absorbs the energy of the impact that the external body receives avoiding that it reaches to the same extent the said internal components to be protected.

Thanks to it, the impact is softened and the necessity to have to incorporate a frame under the motor or battery is eliminated, which reduces the weight and improves the structural performance of the said elements.

DESCRIPTION OF THE DRAWINGS

To complement the description being carried out and in order to assist to best understanding the characteristics of the invention, attached to this specification, as an integral part thereof, there is a set of drawings in which, for illustration and no limitation purpose, the following has been represented.

PREFERRED EMBODIMENT OF THE INVENTION

Figure 1:
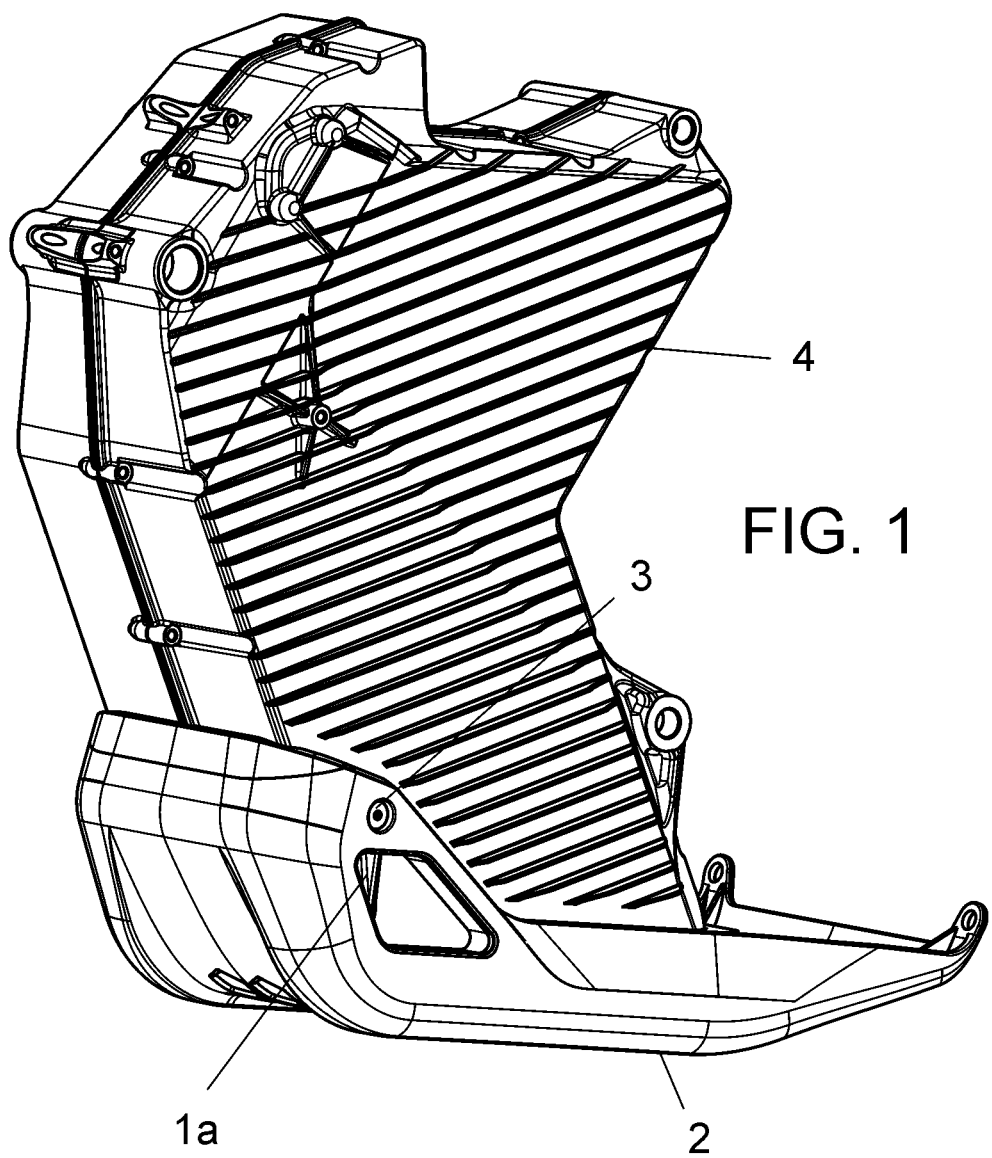
FIG. 1.—It shows a view in perspective of an example of embodiment of the impact protection plate, object of the invention, represented after it is mounted and coupled on the block of motor or battery of the vehicle to which it is designed, its external configuration and arrangement at the lower part of the said block can be seen.
Figure 2:
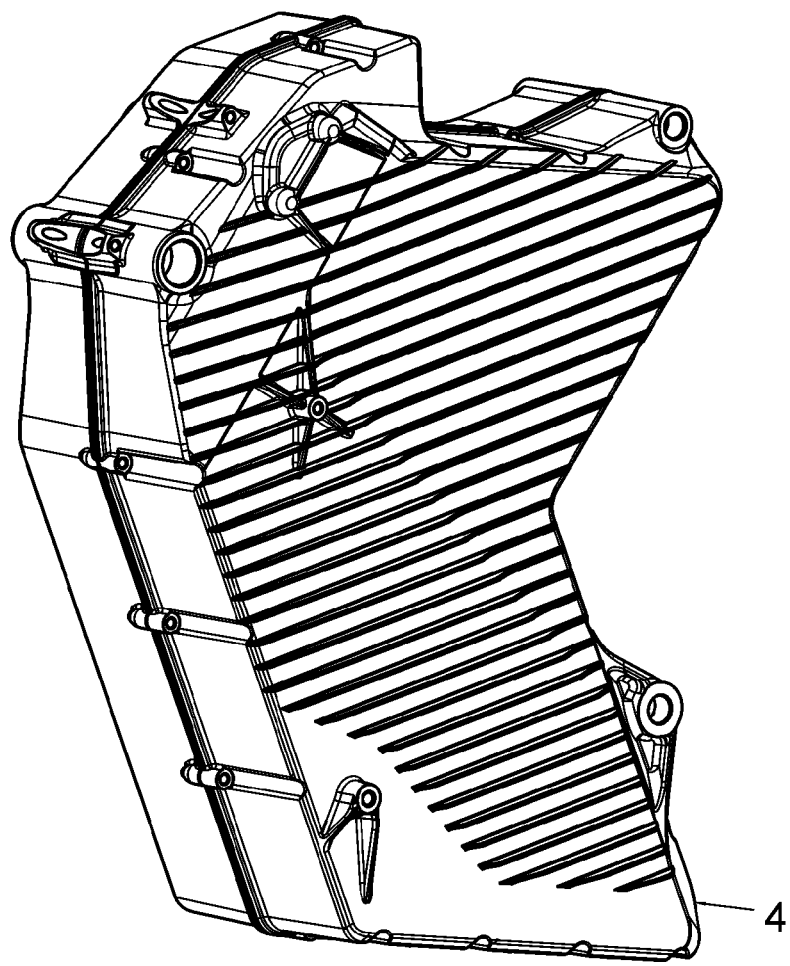
FIG. 2.—It shows a view in perspective of the example of the impact protection plate according to the invention, shown in the FIG. 1, in this case represented exploded and separate from the block of motor or battery to which it is designed, the parts and elements it comprises as well as their configuration and arrangement can be seen.
Figure 2:
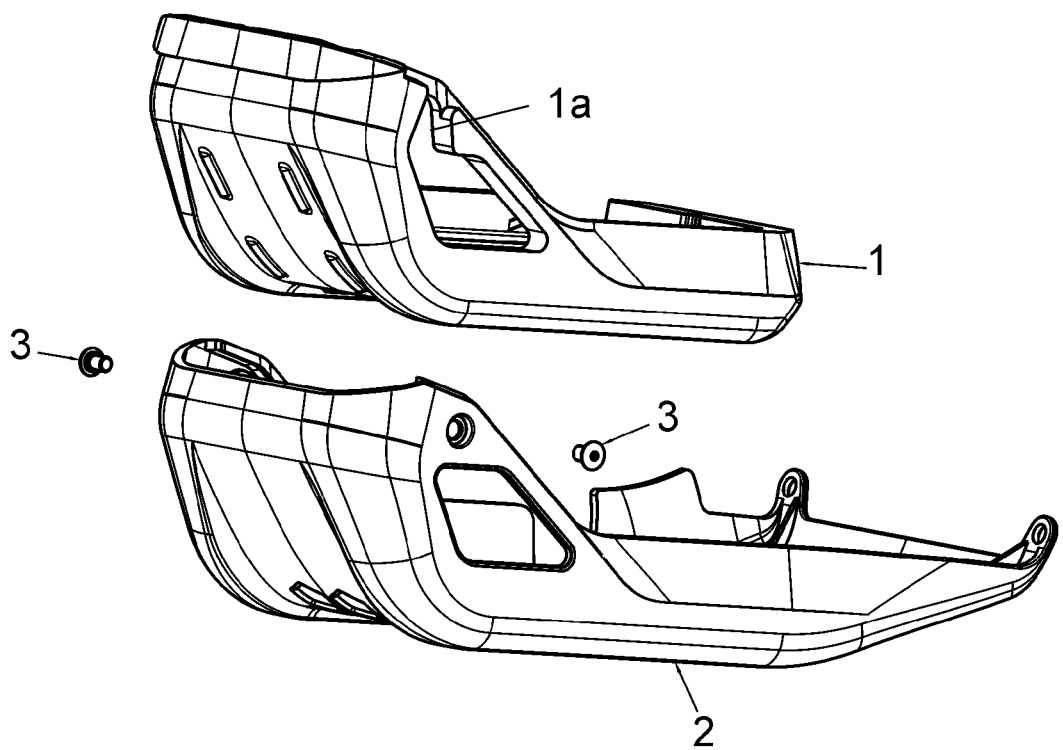
Figure 3:
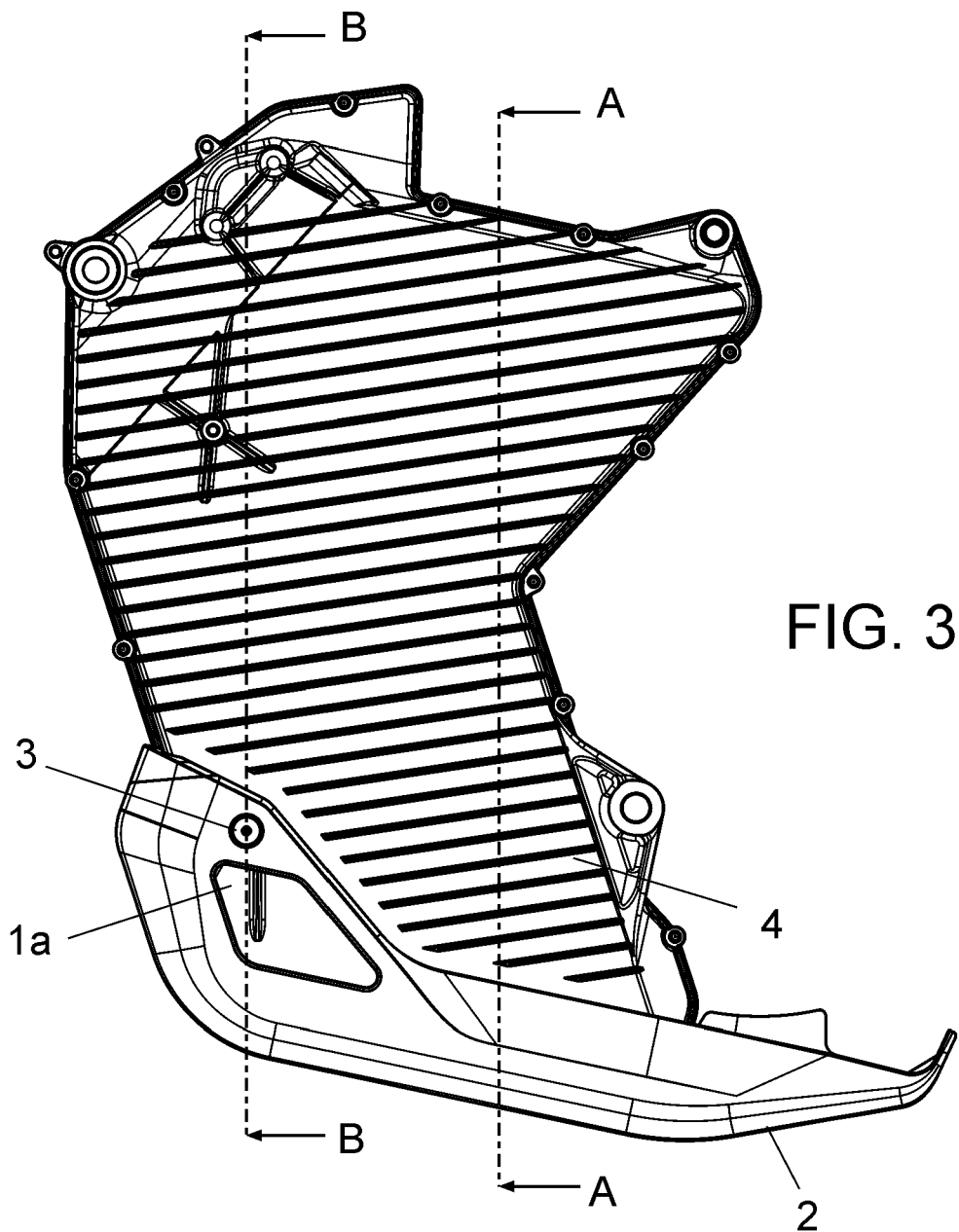
FIG. 3.—It shows a side elevation view of the assembly of the impact protection plate of the invention mounted on the block of motor or battery.
Figure 4:
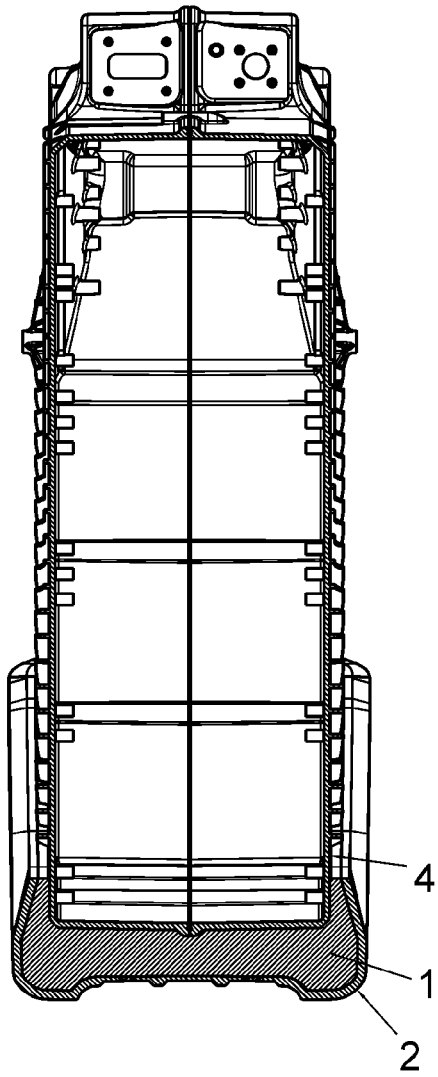
FIGS. 4 and 5.—They show both sectional views of the assembly of the plate and the block of motor or battery mounted, according to the respective sections A-A and B-B mentioned in the FIG. 3.
Figure 5:
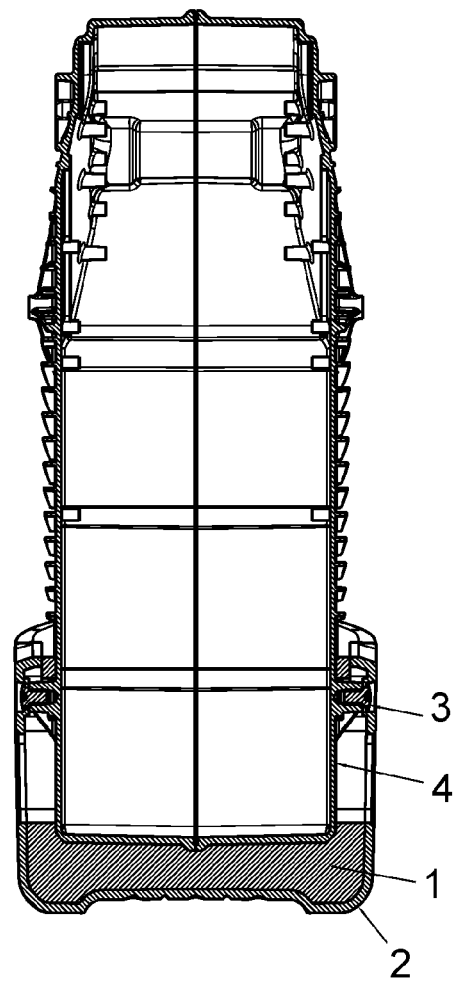

Seen the said figures, and according to the numerals adopted, a non-limiting example of embodiment of the impact protection plate of the invention which comprises what is disclosed in detail thereafter.

Thus, as it can be seen in the said figures, the impact protection plate that, applicable to motorcycles, bicycles and similar vehicles as protection against impacts that can occur and affect the block (4) of the battery or the motor of the said vehicle, comprises:

a protection external body (2) at least partly rigid, directly joined to the block (4) of the battery or motor, and an internal core (1) of resilient material and absorbing the impacts intercalate between the lower base of the block (4) of the battery or motor to be protected and the external body (2)

so that, in case of impact on the external body (2), a displacement of the rigid part of the body (2) towards the block (4) of the battery or motor and compressing the internal core (1) and capable to allow, when the impact ceases, that the external body (2) returns to its initial position ceasing to compress the internal core (1).

With this, when the vehicle receives an impact from below, instead of transferring the force directly to the block (4) of the battery or motor, the protection plate of the invention allows to absorb the impact before it reaches the said block (4). For this, the protection external body (2) distributes the force on the internal core (1) of impact absorbing material.

In a preferred embodiment, the displacement of the rigid part of the body (2) towards the block (4) of the battery or motor, is achieved thanks to the fact that the external body (2) comprises at least a resilient flexible area that, in case of impact on the external body (2) is deformed allowing a displacement of the rigid part of the body (2) towards the block (4) of the battery or motor and compress the internal core (1) In this embodiment, when the impact ceases, (on) the external body (2), the resilient flexible area of the external body (2) returns to its initial position ceasing to compress the internal core (1) and allowing thus that the internal core returns to its initial position.

In a second preferred embodiment, the displacement of the rigid part of the body (2) towards the block (4) of the battery or motor is achieved thanks to the fact that the external body (2) is joined to the block (4) of the battery or motor by means of screws (3) inserted through grooves provided in the external body (2) so that in case of impact on the external body (2), the external body (2) moves towards the block (4) of the battery or motor and compresses the internal core (1). In this embodiment, when the impact (on) the external body (2) ceases, the internal core (1) pushes the external body (2) allowing that the external body (2) returns to its initial position.

Sufficiently disclosed the nature of this invention, as well as the manner of implementing it, it is not deemed necessary to extend anymore its explanation in order that any person skilled in the art understands its extends and the advantages arising from it.

The invention claimed is:

1. An impact protection plate applicable to motorcycles and bicycles for impacts that can occur and affect the block (4) of a battery or a motor of the motorcycles and bicycles, wherein the impact protection plate comprises:
    a protection external body (2) that is at least partly rigid and is adapted to be directly joined to the block (4) of the battery or motor, wherein the protection external body (2) is to be arranged at a lower part of the block (4), and wherein the external body (2) comprises at least a resilient flexible area that in case of impact on the external body (2) is deformed allowing a displacement of the rigid part of the body (2) towards the block (4) of the battery or motor and compression of an internal core (1) of resilient material made of foam that absorbs impacts, and the internal core (1) is intercalated between a lower base of the block (4) of the battery or motor to be protected and the external body (2) with an outer surface of the internal core (1) being conformal to an inner surface of the external body (2), wherein the internal core (1) is formed separate from the external body (2); and
    wherein in case of impact on the external body (2), a displacement of the rigid part of the body (2) towards the block (4) of the battery or motor compresses the internal core (1), and when the impact ceases the external body (2) returns to its initial position ceasing to compress the internal core (1).

2. The impact protection plate according to the claim 1, wherein the external body (2) is joined to the block (4) of the battery or motor by means of screws (3) inserted through grooves provided in the external body (2).

3. The impact protection plate according to the claim 2, wherein the screws (3) are adapted to simultaneously engage the internal core (1) and the external body (2).

4. An impact protection plate applicable to motorcycles and bicycles for impacts that can occur and affect the block (4) of a battery or a motor of the motorcycles and bicycles, wherein the impact protection plate comprises:
    a protection external body (2) that is at least partly rigid and is adapted to be directly joined to the block (4) of the battery or motor with screws (3) inserted through grooves provided in the protection external body (2) off-axis to a direction of impact, wherein the protection external body (2) is to be arranged at a lower part of the block (4), and wherein the external body (2) comprises at least a resilient flexible area that in case of impact on the external body (2) is deformed allowing a displacement of the rigid part of the body (2) towards the block (4) of the battery or motor and compression of an internal core (1) of resilient material made of foam that absorbs impacts, and the internal core (1) is intercalated between a lower base of the block (4) of the battery or motor to be protected and the external body (2); and
    wherein in case of impact on the external body (2), a displacement of the rigid part of the body (2) towards the block (4) of the battery or motor compresses the internal core (1), and when the impact ceases the external body (2) returns to its initial position ceasing to compress the internal core (1).

5. The impact protection plate according to the claim 4, wherein the screws (3) are adapted to simultaneously engage the internal core (1) and the external body (2).

6. An impact protection plate applicable to motorcycles and bicycles for impacts that can occur and affect the block (4) of a battery or a motor of the motorcycles and bicycles, wherein the impact protection plate consists of:
    a protection external body (2) that is at least partly rigid and is adapted to be directly joined to the block (4) of the battery or motor, wherein the protection external body (2) is to be arranged at a lower part of the block (4), and wherein the external body (2) comprises at least a resilient flexible area that in case of impact on the external body (2) is deformed allowing a displacement of the rigid part of the body (2) towards the block (4) of the battery or motor and compression of an internal core (1) of resilient material made of foam that absorbs impacts, and the internal core (1) is intercalated between a lower base of the block (4) of the battery or motor to be protected and the external body (2); and
    wherein in case of impact on the external body (2), a displacement of the rigid part of the body (2) towards the block (4) of the battery or motor compresses the internal core (1), and when the impact ceases the external body (2) returns to its initial position ceasing to compress the internal core (1).

* * * * *